(12) United States Patent
Tryggö

(10) Patent No.: US 8,228,185 B2
(45) Date of Patent: Jul. 24, 2012

(54) CONTAINER LIFTING METHOD AND SYSTEM FOR IMPLEMENTATION THEREOF

(75) Inventor: Dag Tryggö, Trollhättan (SE)

(73) Assignee: Loxysystem AB, Trollhattan (SE)

( * ) Notice: Subject to any disclaimer, the term of this patent is extended or adjusted under 35 U.S.C. 154(b) by 424 days.

(21) Appl. No.: 12/663,278

(22) PCT Filed: Jun. 11, 2008

(86) PCT No.: PCT/SE2008/050699
§ 371 (c)(1),
(2), (4) Date: Dec. 5, 2009

(87) PCT Pub. No.: WO2008/153494
PCT Pub. Date: Dec. 18, 2008

(65) Prior Publication Data
US 2010/0191366 A1    Jul. 29, 2010

(30) Foreign Application Priority Data
Jun. 12, 2007  (SE) ...................... 0701423

(51) Int. Cl.
*G08B 1/08* (2006.01)
(52) U.S. Cl. ................. 340/539.1; 340/539.13; 220/1.5; 220/1.6; 220/315; 220/324; 70/58; 70/63; 410/77; 700/213
(58) Field of Classification Search ............ 220/1.5–1.6, 220/23.2, 23.4, 23.6, 200, 324, 315; 70/58, 70/63, 263–264; 410/52–95; 700/213–244; 340/686.1, 686.6, 539.1–539.32, 10.1–10.6
See application file for complete search history.

(56) References Cited

U.S. PATENT DOCUMENTS
7,002,472 B2 *  2/2006  Stratmoen et al. ....... 340/539.26
7,019,640 B2 *  3/2006  Canich et al. ................. 340/531
(Continued)

FOREIGN PATENT DOCUMENTS
WO    98/06656 A1    2/1998
(Continued)

OTHER PUBLICATIONS
Swedish Patent Office, Int'l Search Report in PCT/SE2008/050699, Sep. 19, 2008.

*Primary Examiner* — Daniel Wu
*Assistant Examiner* — Ryan Sherwin
(74) *Attorney, Agent, or Firm* — Potomac Patent Group PLLC (57) ABSTRACT

The invention relates to a method for lifting containers (6), all containers (6) to be lifted being connected by means of locks (1). The method comprises the steps of by an external unit (2, 4) requesting a first piece of information regarding if the locks (1) that are arranged on a container to be lifted are locked or unlocked, requesting a second piece of information regarding one or more given requirements that the locks (1) to be lifted and are locked meet. Then said first and second pieces of information regarding the locks to be lifted are transferred to the external unit (2, 4) or to another unit. In the external unit (2, 4) or in another unit it is then judged if all locks (1) that should be locked are locked and if they meet requirements required for the lift. If that is the case, lift of said container (6) takes place. The invention also relates to a system.

17 Claims, 8 Drawing Sheets

U.S. PATENT DOCUMENTS

| | | | |
|---|---|---|---|
| 7,216,806 B2 * | 5/2007 | Kurita et al. | 235/385 |
| 7,323,981 B2 * | 1/2008 | Peel et al. | 340/539.13 |
| 7,475,814 B2 * | 1/2009 | Wingo et al. | 235/384 |
| 7,522,043 B2 * | 4/2009 | English et al. | 340/545.6 |
| 7,922,085 B2 * | 4/2011 | Thomas et al. | 235/384 |
| 2001/0035410 A1 * | 11/2001 | Taube et al. | 220/1.5 |
| 2006/0220829 A1 * | 10/2006 | Johnson | 340/505 |
| 2008/0020724 A1 * | 1/2008 | Orrell | 455/187.1 |
| 2010/0171597 A1 | 7/2010 | Tryggo | |

FOREIGN PATENT DOCUMENTS

| | | |
|---|---|---|
| WO | 01/62657 A1 | 8/2001 |
| WO | 2006/025790 A1 | 3/2006 |

* cited by examiner

CONTAINER LIFTING METHOD AND SYSTEM FOR IMPLEMENTATION THEREOF

TECHNICAL FIELD

The present invention relates to a method for enabling and guaranteeing safe multiple lifts of containers. The invention also relates to a system for implementation of the method.

BACKGROUND

Today, containers are used for transporting load goods everywhere in the entire world. When containers should be conveyed to other continents, this preferably takes place by the containers being loaded on vessels for further transportation to the place of destination. In order for the transportation via vessel should work in safe way, it is required among other things that all containers on board have to be transportation-locked by means of some type of locking device.

Today, four container locks are placed in each corner/bottom of a container. Each lock then locks into either a subjacent container alternatively the vessel deck (if the container is farthest down in a pile). Today, up to seven (7) containers are piled on each other above deck in transportation via vessel. It means that upon unloading and loading of containers, special staff has to climb around on the container piles and lock and unlock, respectively, container corner locks manually, occasionally by means of long bars. This is both time-consuming and dangerous.

Containers are loaded and unloaded today by the fact that a crane seizes into lifting holes placed on the upper part of the container and then lifts and moves the container. In order to make the process more effective, there is a need of being able to lift more than one container simultaneously where the containers hang under each other. The containers are then connected by means of container corner locks. Today, it is primarily preferred to be able to lift two containers simultaneously—a so-called tandem lift. However, in the future, there will be a need of lifting more than two containers simultaneously.

However, there are some problems with lifting more than one container simultaneously. Firstly, it has to be ascertained that the container corner locks under the lowermost container to be lifted are loosened from subjacent points of attachment. Secondly, it has to be ascertained that all other container corner locks holding together the containers to be lifted are locked. Thirdly, it has to be ascertained that all container corner locks holding together the containers to be lifted are approved for use in a lift of one or more containers.

Locks that should be used in lifts of more than one container simultaneously are tested to verify that they withstand the load that is required. This test is then only valid during a limited period of time. This means that it has to be ascertained if all locks have been tested and when this took place.

Today, there is no better method than to manually verify the lock status of the container corner locks, and verify that each container corner lock involved in a lift of more than one container simultaneously is classified for this, as well as that the classification still is valid.

SUMMARY OF THE INVENTION

Thus, an object of the present invention is to provide a method that enables safe lifts of more than one container at a time, which not entails any risks for staff and which is simple and inexpensive and especially requires less staff requirement and goes faster.

Another object of the present invention is to provide a method that has a maximum safety in lifts of more than one container at a time irrespective of where the containers have been loaded.

Said object is attained by the invention by means of a method for lifting containers according to the invention. The method is commenced by the fact that an external unit requests a first piece of information regarding if the locks that are arranged on a container to be lifted are locked or unlocked. The external unit also requests a second piece of information regarding one or more given requirements that the locks to be lifted and are locked meet. On request or automatically, the first and second pieces of information are then transferred from the locks to be lifted and to the external unit or to another unit. In the external unit or in another unit, it is then judged if all locks that should be locked are locked and if they meet requirements required for the lift. If the answer is yes, lift of the containers is executed. The mentioned requirements are requirements that are made on the locks to act as connecting unit between two containers in lifts of more than one container, e.g., the maximal load that the locks may be exposed to as well as until what date that the lock may be exposed to said load.

The method guarantees safe lifts of more than one container simultaneously since it generally becomes impossible to avoid to detect that a lock is not suitable for multiple lifts.

Another object of the present invention is to provide a method that optimizes the number of lifts that needs to be made to unload containers from a stack or a vessel.

Said object is attained by the invention by means of a method that is initiated by the fact that an external unit requests a first piece of information regarding if the locks that are in a certain stack are locked or unlocked. To the external unit or to another unit, said first piece of information is then transferred as well as a second piece of information regarding one or more given requirements that the locks that are in the stack meet. From at least one lock belonging to each container that is in the stack and to the external unit or to another unit, a third piece of information is transferred regarding the weight of said container. Based on the first, second and third, respectively, pieces of information forwarded from the locks, a judgement is made regarding which containers that can be lifted simultaneously, after which the containers are lifted.

The method optimizes the number of lifts that needs to be carried out, which minimizes the work for a crane operator at the same time as it takes consideration to the status of the locks and the load that the locks are limited to and the weight of the different containers.

The above-mentioned objects are attained by the invention also by means of a system for lifting containers. The system comprises at least a number of locks arranged to be connected to a container and to work as connecting elements between two containers. Each lock comprises a receiver and a transmitter as well as one or more storage units for storing a first piece of information regarding whether the lock is in locked or unlocked state as well as a second piece of information regarding one or more given requirements that the lock meets. The locks are provided with means for transferring the first and the second piece of information to an external communication unit. The external unit or some other unit belonging to the system is provided with means for judging if more than one container can be lifted simultaneously.

DESCRIPTION OF FIGURES

The invention will in the following in a non-limiting way and for illustrative reasons be described, reference being made to the accompanying figures in which.

DETAILED DESCRIPTION OF THE INVENTION

The present invention provides a method for checking and verifying status of container locks, which lock together a pile of containers under a crane yoke by communicating with the container locks.

Figure 1:
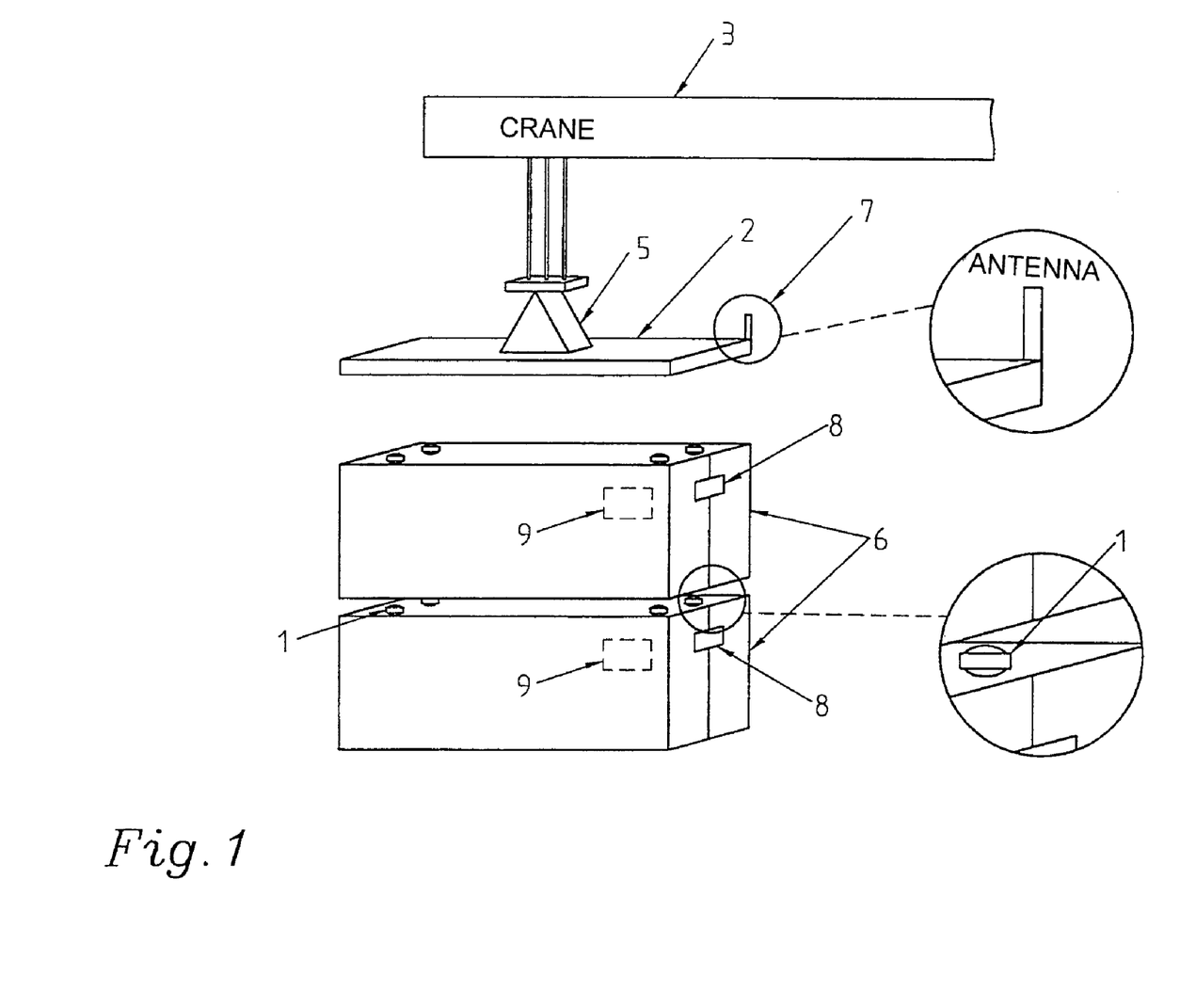
FIG. 1 shows a crane equipped with a yoke for lifting containers.

FIG. 1 show a crane 3 equipped with a yoke 5 for lifting containers 6. On the yoke of the crane, there is equipment 2, 7 mounted for communicating with container locks 1, which are under the yoke.

Figure 2:
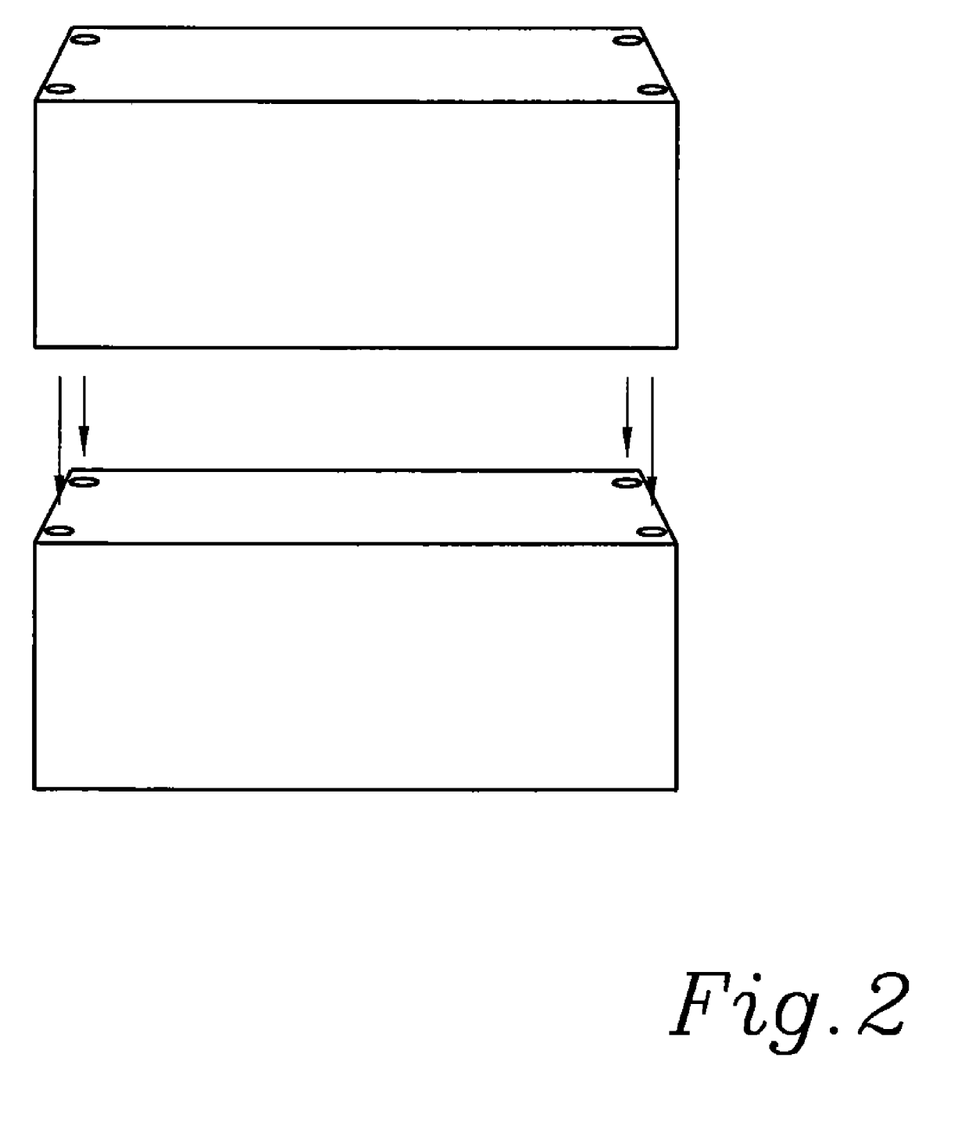
FIG. 2 shows how two containers are coupled together by means of container corner locks.

FIG. 2 shows two containers having container locks 1. The container locks 1 in the lower edge of the upper container lock the container against the lower container. In lifts of more than one container simultaneously, the locks under the lowermost container have to be set in unlocked state. Furthermore, the container locks, which are situated between containers to be lifted, have to be in a locked state. Container corner locks are fastened on the underside in each corner of a first container and lock into a second subjacent container when the first is lowered down on top of the second container. The locks may also lock in a transportation vehicle, boat deck or another device intended to secure transportation of said container. In connection with locking, preferably an automatic group allocation takes place, where the four locks locking a specific container are allocated a unique group identification number. Remote controlled unlocking of the locks then takes place preferably by an external unit sending out a request regarding which locks that are in the vicinity. Each lock sensing the request, sends out its group identification number as answer, all answers being processed and it is established which locks that lock the container in question.

Figure 3:
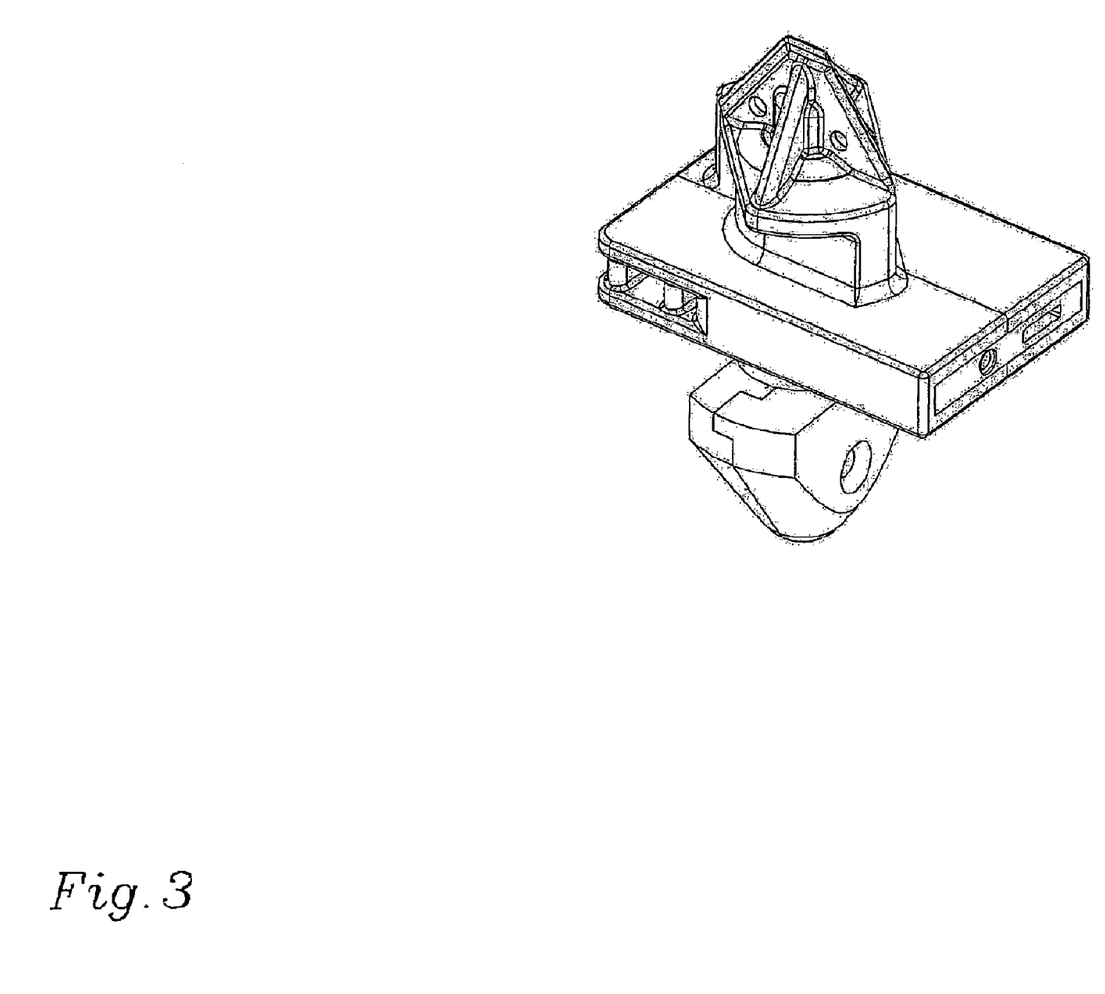
FIG. 3 shows an example of a design of a device according to the invention, a so-called container corner lock.

FIG. 3 shows an example of a lock 1 arranged to be connected to a container and to work as connecting element between two containers, henceforth denominated container corner lock. The container corner locks 1 are internally equipped with electronic functions for storing information as well as for receiving and sending information that should be stored. Therefore, inside a container corner lock according to the invention, there is room for radio unit, memory, motor, sensor, antenna as well as other electronics.

Figure 4:
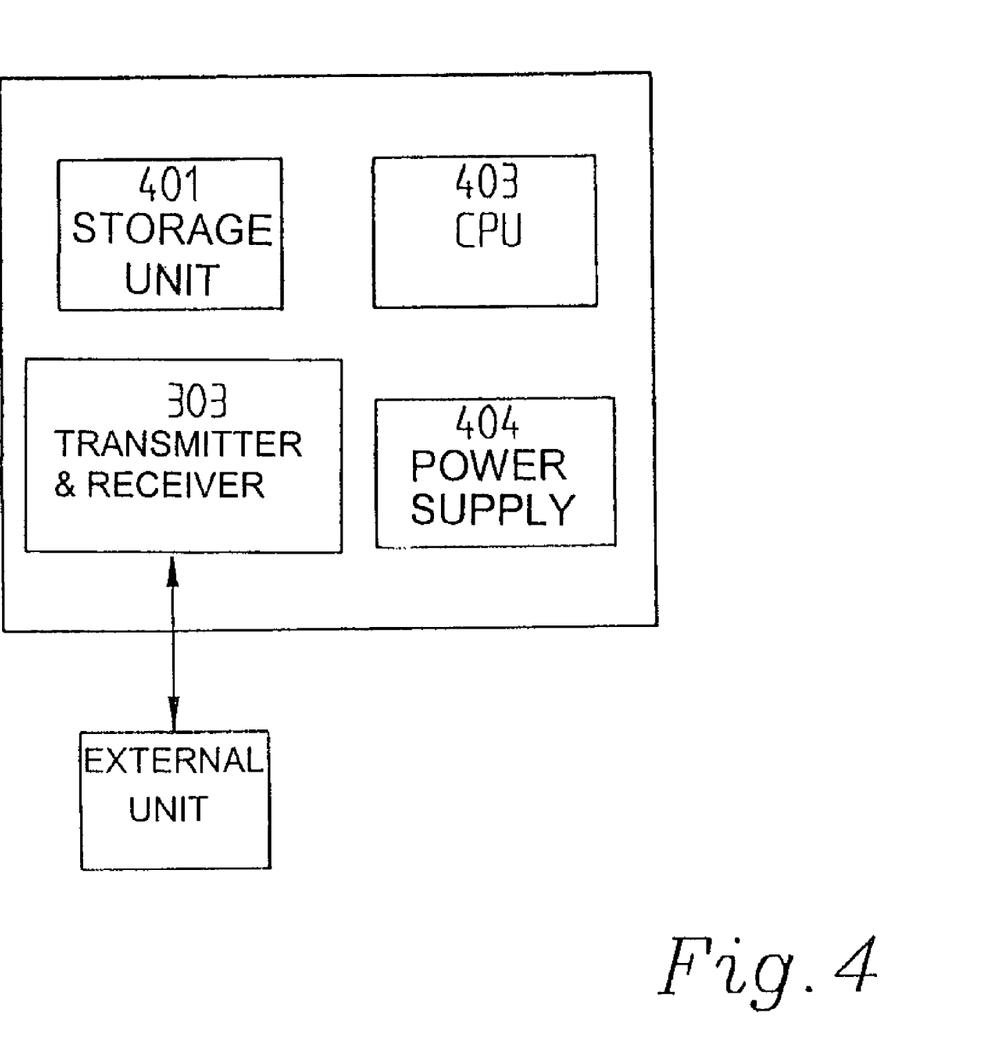
FIG. 4 shows a very schematic overview of the interior of a container corner lock.

FIG. 4 shows highly schematically how a container corner lock 1 internally is equipped with electronic functions for storing information as well as communicating with of other units. Therefore, the container corner lock 1 according to the invention is provided with a storage unit 401 for storing information regarding whether the lock is in locked or unlocked state as well as information regarding one or more given requirements that the lock meets. The lock is furthermore provided with transmitter and receiver functionality 402 to be able to transfer information that is stored in the lock to an external unit as well as to communicate with the external unit. The lock may also be provided with a control unit 403 to keep track on when it is time to transfer information to or from the lock and which information that should be stored in the storage unit 401. In addition, the lock according to the present invention is preferably provided with a motor or the like to enable locking and unlocking, respectively, of the lock, power supply means 404 as well as possible other electronics. Means for power supply may, for instance, be a disposable battery or a rechargeable battery or some other form of source of power.

Figure 5:
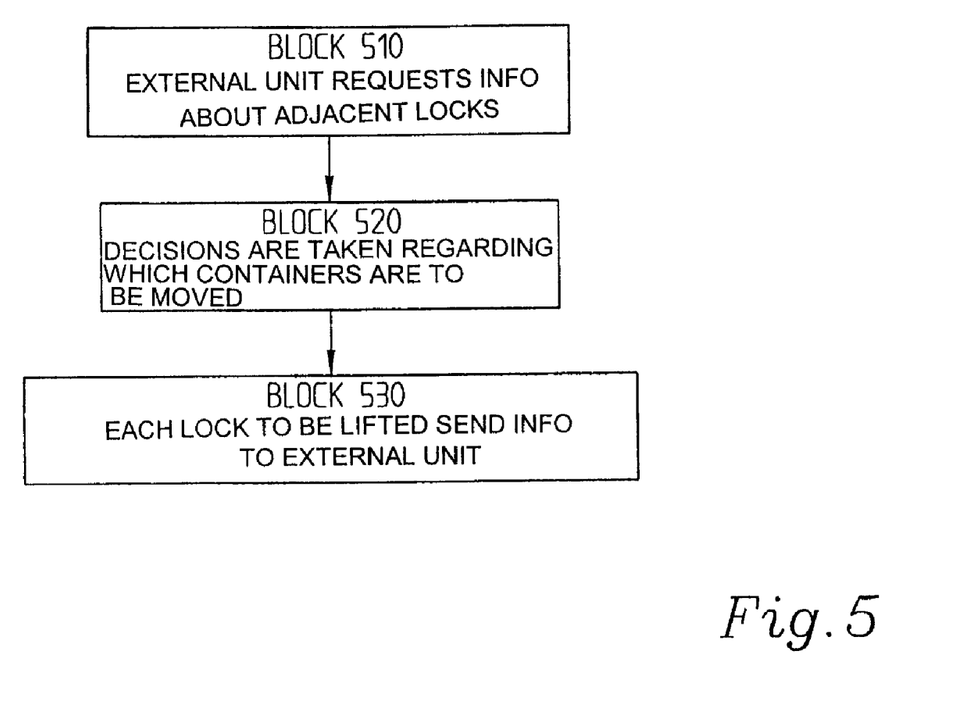
FIG. 5 shows a flow chart over a method according to the invention for multiple lifts of containers.

FIG. 5 shows a flow chart over a method according to the invention for reading data from a container corner lock in connection with lift of one or more containers. Readout of information from a container corner lock is commenced in block 510 by an external unit approaching the container and requesting information about present locks in the vicinity. The external unit may, for instance, be a hand-held unit or a unit fastened or situated adjacent to a crane. The external unit may also be a fixed unit situated on the vessel or in harbour, but it is however required that the unit simply can communicate with the locks. An advantage of arranging the unit adjacent to a crane is that no additional staff is required to read the container, wherein readout and lifting can take place in one and the same moment. In block 520 decision is made regarding which containers that are desired to be lifted. The decision does not have to be an active decision but it may be that it in advance has been determined to, if possible, lift two containers simultaneously in all lifts that are to be carried out from a certain stack or a certain vessel. In block 530, one, several or each lock/locks to be lifted forwards/forward information to an external unit. Preferably, it is determined upon the grouping of the locks, i.e., when it is determined which locks that should belong to a certain container, which lock or locks that should handle the communication with the external unit. Other locks provide communicating lock with required information. The information sent is information regarding the status of the locks, i.e., if the locks are in locked or unlocked state. On the same occasion or on a later or earlier occasion, information is sent regarding which requirements made that the locks meet, i.e., information regarding how long the locks are regarded to meet certain minimum requirements regarding load or; when the lock was classified, how long the classification is valid, as well as if the lock is adapted to multiple lifts or which load that the lock is constructed to carry. The lock is preferably provided with this information in connection with the lock being manufactured or upon classification by an independent classification company. Exactly what this information should comprise can also be modified and be adapted based on, for instance, which requirements that a specific harbour makes on the locks in order to carry out multiple lifts. In block 540, it is determined if all locks that should be locked are locked as well as if they meet predetermined classification requirements. If it turns out that a lock that should be locked and that couples together two containers to be lifted actually is not locked, no multiple lifts with this lock as connecting unit can be made. The same thing applies if one or more locks do not meet the classification requirements that are made on the locks to be able to be used in multiple lifts. In such cases, the locks are opened that couple together containers and that belong to the same group of locks as a lock that does not meet the above-mentioned lock criteria. Preferably, an unlocking command is sent from the external unit, or from another unit, to the locks locking the lowermost situated container to be lifted. Thereby, containers that are situated underneath this lock group cannot participate in the multiple lift and if only one container is situated above said lock group, a conventional single lift takes place. However, if all lock criteria are met for all containers concerned, a multiple lift according to block 550 of two or more containers can be carried out without risk of the connecting locks not being in locking position as well as not having sufficient strength.

If all locks do not communicate with the external unit, but only one or some locks handle the communication, it may already in the locks (the communicating lock or in some other lock) be established which lock that is the weakest lock, i.e., which lock that has the earliest date when the classification ceases/ceased and/or the lock that is constructed to carry the least load. If the weakest lock meets all requirements made in order to realise a certain lift, the external unit thereby knows that also other locks meet the requirements.

According to a preferred embodiment, information is also sent regarding the weight of a container, from at least one of the locks that belong to each container to be lifted and to an external unit. This piece of information is preferably sent in connection with the other information according to block 530 being sent to the external unit. In block 540, consideration is then made to the total weight of the containers to be lifted and if the locks are adapted to lift the weight that the containers will load the locks with.

Figure 6:
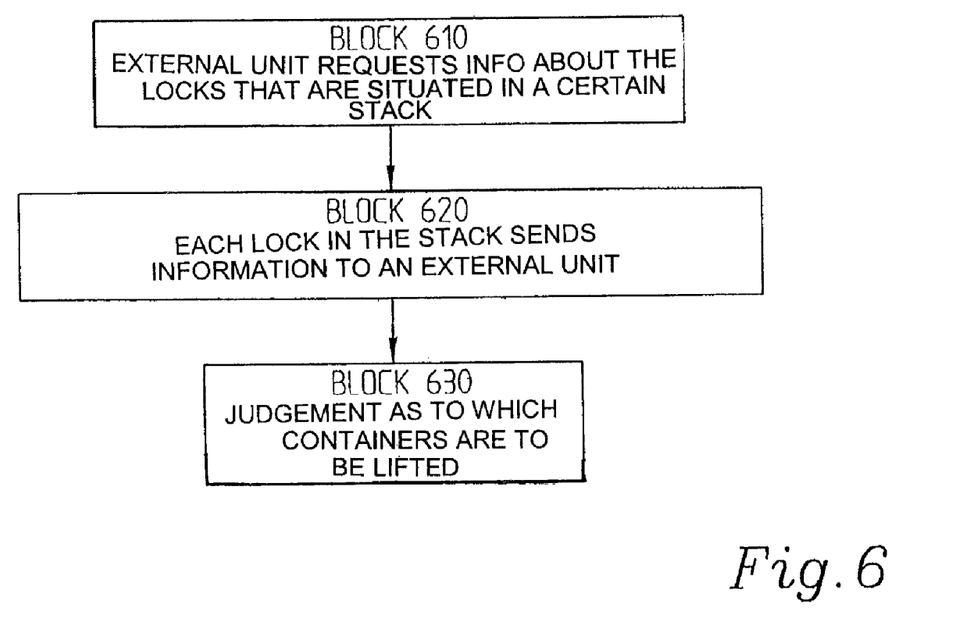
FIG. 6 shows a flow chart over an alternative method according to the invention for multiple lifts of containers.

FIG. 6 shows a flow chart over an alternative, or additionally improved, method according to the invention for reading data from a container corner lock in connection with lift of one or more containers. The method intends to minimize the number of lifts required to unload all containers that are in a certain stack and is initiated by an external unit sending out a request to the locks that are in a container stack according to block 610. One, several or each lock/locks then sends/send in block 620 out information, preferably to the same external unit, regarding if the lock is locked or unlocked and information regarding the classification of the lock. Advantageously, information regarding the weight of the containers is also sent from at least one lock belonging to each container that is in said stack to the external unit. In the external unit or in some other unit having calculation functionality it is then judged, in block 630, which containers that can and should be lifted simultaneously. Just like in block 540, it is determined if all locks that should be locked are locked as well as if they meet predetermined classification requirements. If it turns out that a lock that should be locked is not locked, and that couples together two containers to be lifted, multiple lift with this lock as connecting unit cannot be carried out. The same thing applies if one or more locks do not meet the classification requirements made on the locks so that they should be able to be used in multiple lifts. For instance, the judging of which containers that should be included in which lift may be carried out by determining that as many containers as possible should be lifted in one and the same lift without the maximum weight being exceeded. The judging may also be carried out so that the smallest number of lifts takes place at the same time as the total weight of the different lifts is as similar to each other as possible. By means of this method for multiple lifts, the number of lifts that takes place upon unloading of containers from a stack or from a vessel can be optimized so that the smallest feasible number of lifts takes place. In block 640, the containers are then unloaded that are in the stack having an optimum number of lifts for the stack, i.e., by means of as few lifts that the locks allow. Upon the judging, consideration naturally has to be given to the fact that considerably higher requirements are made of the container locks that couple together two containers being higher up in the pile than those container locks coupling together two containers being further down in the pile, provided that more than two containers are lifted simultaneously.

Figure 7:
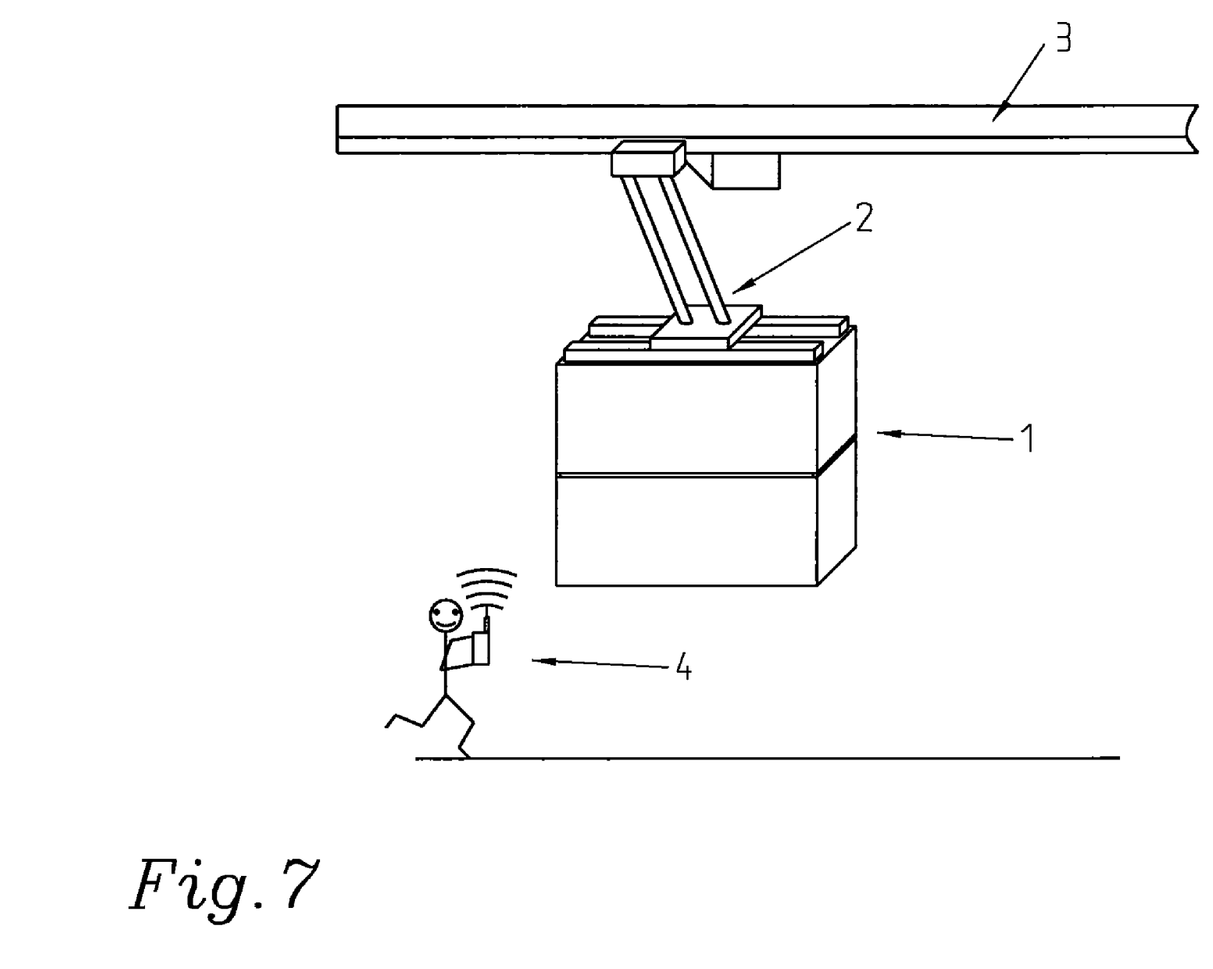
FIG. 7 shows a schematic picture over an alternative method where two containers are lifted simultaneously.
Figure 8:
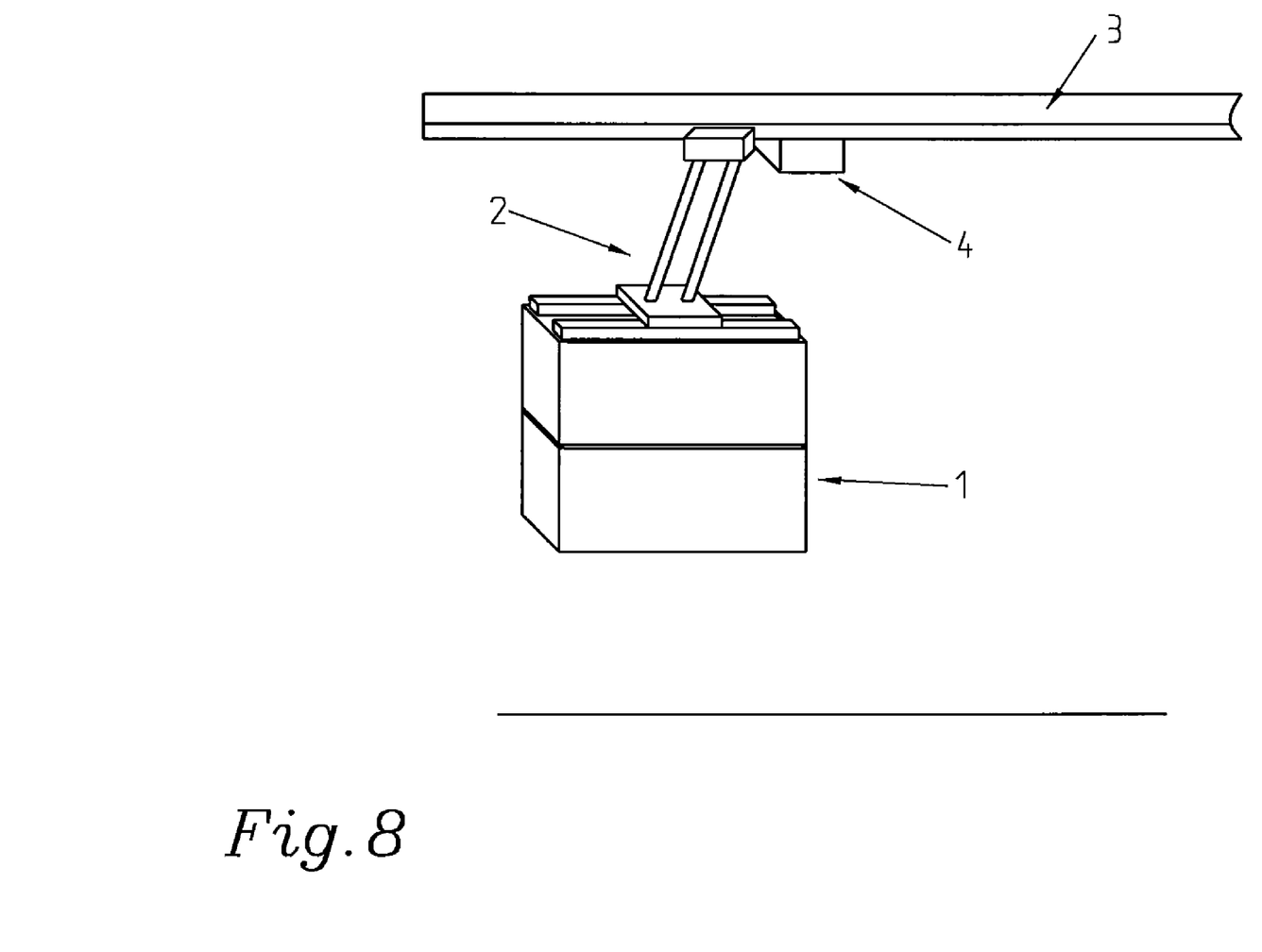
FIG. 8 shows a schematic picture over a preferred method where two containers are lifted simultaneously, and FIG. 9 finally shows a perspective view of a bay with containers.

FIG. 7 and FIG. 8 show schematic pictures over methods where two containers are lifted simultaneously. In FIG. 7, a person is standing by the side and communicates with the container corner locks by means of a handheld communication equipment 4. FIG. 8 shows a schematic picture over a preferred method where two containers are lifted simultaneously. A unit 2 on a crane 3 communicates with container corner locks 1 by means of communication equipment 2 fastened on the yoke or on the crane 3. This method takes place correspondingly as is described in FIG. 7 and may be used when equipment 2 to telecommunicate with the radio units inside the container corner locks 1 is arranged on or adjacent to the crane. This unit/equipment 2 may for instance be arranged on the yoke 5 of the crane 3 or on some other part of the crane. By arranging the unit 2 in direct connection to the crane it is guaranteed that the unit comes sufficiently near the container corner locks to enable communication between the unit and the locks. This eliminates the need of physical manpower in the load zones during loading/unloading occasions. This method that means a readout of different information types coupled to the container and the goods thereof upon the loading/unloading occasion thereby gives possibility of fully automatic loading and unloading when information regarding the status of the locks and the weight of the container or of the containers becomes available when the lifting equipment comes in the vicinity of or seizes the container. Upon lifting of two containers simultaneously, also eight locks will in these examples be lifted. Four belonging to the upper container and four belonging to the lower one.

Figure 9:
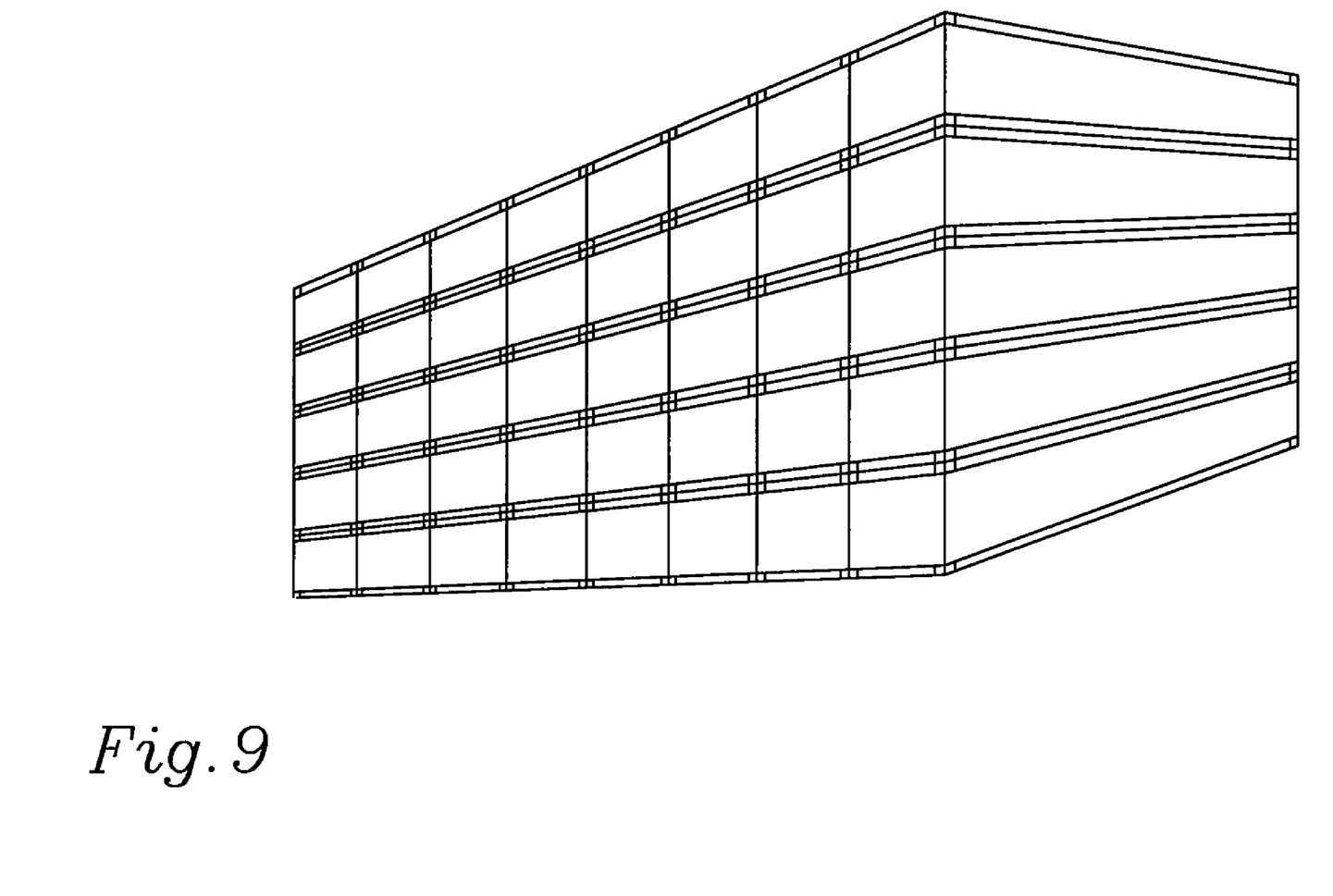

FIG. 9 shows a perspective view of a bay with containers. In this case, the picture 8 shows stacks of 5 containers. From a unit that may be called external unit or central processing unit, it is possible to send commands to and receive answers from the container locks that are in a pile of containers under the crane yoke. The central unit communicates with the different container locks to guide which locks that should be locked, which that should be unlocked as well as verify lock status and classification status. If the central unit determines that correct locks are unlocked, correct locks are locked and all locks that should be included in a lift of more than one container simultaneously are reported, either the central unit itself makes a decision of carrying out a lift or status is communicated to another control unit or crane operator, which then can carry out the lift.

The way to communicate between a central processing unit and container corner locks 1 as well as between container corner locks may take place by means of different methods. The communication may, for instance, take place wirelessly by radio, wired, optically, by sound including ultrasound or by mass waves/vibrations.

The nature and the function of the invention should have been clear of what has been said above and shown in the drawings. The invention is naturally not limited to the embodiments described above and shown in the accompanying drawings. For instance, the invention is not limited to tandem lifts, i.e., lifts of two containers simultaneously, but even more containers may be lifted in one and the same lift. Modifications are feasible, for example by usage of equivalent technique, without departing from the protection area of the invention, such as it is defined in the claims.

The invention claimed is:

1. A method of lifting containers, comprising:
   requesting, by an external unit, a first piece of information regarding if locks on a container to be lifted are locked or unlocked, wherein the locks work as connecting elements between two containers;

requesting, by the external unit, a second piece of information regarding one or more given requirements met by the locks on the container to be lifted that are locked;

transferring, from the locks, the first and second pieces of information to the external unit or to an other unit;

judging, by the external unit or the other unit, if all locks that should be locked are locked and if they meet the one or more given requirements; and if so;

lifting the container.

2. The method of claim 1, further comprising transferring, from at least one lock of the locks on each container to be lifted, information regarding a weight of the respective container; wherein the judging is based on a total weight of containers to be lifted and if the locks meet requirements for lifting the weights that the respective containers are loaded with.

3. The method of claim 1, further comprising transferring, from the external unit, unlocking commands to at least one lock locking a lowermost-situated container to be lifted.

4. The method of claim 1, wherein the judging is carried out in the external unit.

5. The method of claim 1, wherein the second piece of information includes information regarding to which date the locks are regarded to meet certain minimum requirements regarding load.

6. A method of lifting containers, comprising:

requesting, by an external unit, a first piece of information regarding if locks on a container in a stack of containers are locked or unlocked, wherein the locks work as connecting elements between two containers;

transferring, from at least one lock belonging to each container in the stack of containers to the external unit or an other unit, the first piece of information and a second piece of information regarding one or more given requirements met by the locks;

transferring, from at least one lock belonging to each container in the stack of containers to the external unit or the other unit, a third piece of information regarding a weight of the respective container;

judging, based on the first, second, and third pieces of information, which containers can be lifted simultaneously; and lifting the containers which are judged to be lifted.

7. The method of claim 6, further comprising transmitting, from the external unit or the other unit, unlocking commands to locks locking a lowermost-situated container to be lifted.

8. The method of claim 6, wherein the external unit includes a unit connected to a lifting device.

9. The method of claim 6, wherein the external unit includes a mobile unit.

10. The method of claim 6, wherein the judging is carried out in the external unit.

11. The method of claim 6, wherein the second piece of information includes information regarding to which date the locks are regarded to meet certain minimum requirements regarding load.

12. A system for lifting containers, each container having a number of locks connected thereto that work as connecting elements between two containers, at least one lock on each container includes a device configured to transmit and receive information and a memory configured to store a first piece of information regarding whether the lock is locked or unlocked and a second piece of information regarding one or more given requirements met by the lock, the system comprising:

an external communication unit configured for communicating with the at least one lock on each container and for judging, based on the first and second pieces of information, if more than one container can be lifted simultaneously.

13. The system of claim 12, wherein the judging is further based on information about a weight of a container that a respective lock communicates to the external communication unit.

14. The system of claim 12, wherein the external communication unit is configured for judging a number of containers that can be lifted simultaneously.

15. The system of claim 12, wherein the external communication unit is configured to optimize a number of lifts of containers that are in a stack.

16. The system of claim 12, wherein the external communication unit includes a unit that is arranged adjacent to a crane and that includes a device configured for reception and transmission of information.

17. The system of claim 12, wherein the external communication unit includes a mobile hand unit that comprises a device configured for reception and transmission of information.

* * * * *